United States Patent
Smith

[11] 3,887,882
[45] June 3, 1975

[54] ELECTRIC DISCHARGE LASER WITH ELECTROMAGNETIC RADIATION INDUCED CONDUCTIVITY ENHANCEMENT OF THE GAIN MEDIUM

[75] Inventor: David C. Smith, Glastonbury, Conn.

[73] Assignee: United Aircraft Corporation, East Hartford, Conn.

[22] Filed: Aug. 1, 1972

[21] Appl. No.: 277,023

[52] U.S. Cl........... 331/94.5 P; 331/94.5 G; 330/4.3
[51] Int. Cl.............................................. H01s 3/09
[58] Field of Search................... 330/4.3; 331/94.5;

[56] References Cited
UNITED STATES PATENTS

| | | | |
|---|---|---|---|
| 3,351,870 | 11/1967 | Goldsmith et al. | 331/94.5 |
| 3,464,023 | 8/1969 | Birnbaum | 331/94.5 G |
| 3,464,025 | 8/1969 | Bell | 331/94.5 T |
| 3,513,402 | 5/1970 | Marrison | 330/4.3 |
| 3,560,876 | 2/1971 | Airey | 331/94.5 |
| 3,657,600 | 4/1972 | Wiegand | 331/94.5 P |

OTHER PUBLICATIONS

Buegek et al., "Premixed C W Chemical Laser," 12/15/70, App. Phys. Letts., Vol. 17, No. 12, pp. 514–516.

"$CO_2$ Laser with High Power per Unite Wavelength," 2/20/69, Electronics Letters, Vol. 5, No. 4, p. 63.

Primary Examiner—Maynard R. Wilbur
Assistant Examiner—N. Moskowitz
Attorney, Agent, or Firm—Anthony J. Criso

[57] ABSTRACT

A laser concept is disclosed in which the electrical conductivity of the gain medium is enhanced by the absorption of electromagnetic radiation. The enhanced conductivity is caused either by photoionization or electron cascade ionization absorption of single frequency electromagnetic radiation by the laser gain medium. Some embodiments include an auxiliary source of ionizing radiation such as a low power laser or a pumping lamp. Alternate embodiments discuss the use of a single resonator which is subjected to two sequenced electrical pulses. One variation to the embodiments discussed includes providing seed material to the gain medium in order to encourage better interaction with the ionizing radiation. Another variation of the double pulsed embodiment uses a gain medium which includes two different laser gases; the laser output from the first of the laser gases provides the auxiliary ionization necessary to the electric pumping of the second laser gas.

12 Claims, 6 Drawing Figures

ELECTRIC DISCHARGE LASER WITH ELECTROMAGNETIC RADIATION INDUCED CONDUCTIVITY ENHANCEMENT OF THE GAIN MEDIUM

BACKGROUND OF THE INVENTION

1. Field of Invention

This invention relates to lasers and more particularly to enhancement of the population inversion produced in a gaseous medium with electric discharge means by preconditioning of the gain medium with electomagnetic radiation.

1. Description of the Prior Art

An extensive effort has been made and is being expended in the pursuit of more power in the output from high pressure electric discharge gas lasers. A peak power in excess of fifty megawatts has been reported from a carbon dioxide laser system in which the gain medium was maintained at a pressure of one atmosphere. One of the limitations which has prevented even higher power is the inability to electrically excite the laser medium without experiencing the formation of electric arcs in the laser gain medium. These electric arcs effectively consume electrical power which would otherwise be available to pump the gain medium; arcing also causes heating of the gain medium, a condition which is detrimental to the production of laser energy.

The operation of a gas laser which is pumped by a nonarcing electric discharge involves complex discharge processes. The mechanics of the discharge can be conceptually described in terms of three distinct functions. Initially the medium to sustain the discharge must be provided with a sufficient supply of electrons to allow the initiation of a current flow across the medium. This initial electron supply is usually provided by subjecting the gain medium to an electric potential which is sufficient to dislodge electrons from the gas atoms and cause the gain medium to become suitably electrically conductive. Subsequent to the initial electron flow, the medium must be continually ionized at a rate which replenishes the supply of electrons lost from the gain medium; the principal cause of electron loss is electron ion recombination processes. As a practical matter the electric field gradient required to cause the initial ionization of the gas is greater than the field gradient required to maintain the conductivity of the gas medium at some preselected level. Finally, the discharge must provide the energy required to excite enough atoms in lower energy levels of the gaseous medium to upper energy levels of the medium to produce a population inversion suitable for laser action. Again the electric field gradient required for the pumping action is less than the field gradient required to provide the initial supply of electrons that increases the conductivity of the gain medium and allows the ionization producing current to flow.

During the process of producing a population inversion in the gain medium, the best results occur when a uniform high current is passed through the gain medium producing a maximum population inversion while avoiding a high current or arc discharge through the medium, since an arc mode discharge consumes electrical power and also causes heating of the gas.

The early versions of high pressure electrical discharge lasers utilize a single electrical excitation apparatus to produce the initial ionization of the gas, to replenish the electron loss by recombination processes, and to pump the gain medium. The maximum electric field gradient which is required for any these processes occurs when the initial ionization of the gas is being produced. Therefore, throughout the entire population inversion process, the gain medium is exposed to an electric field gradient which is determined by the initial ionization requirement but is greater than necessary for pumping. The overall result is a system that has a low power output due to the tendency of the discharge to transition into an arc that terminates the laser action.

One method of improving the output from a pulse electric discharge laser is to correctly match the electrical characteristics of the field gradient to the optimum gain medium requirements during both initial ionization and electrical pumping of the medium. Improved high pressure electric discharge lasers have been built in which a low quality ionization discharge is generated with an auxiliary electrode; see for example, "Auxiliary Ionization of DC Electric Discharge Electrode Boundary Sheets," U.S. Pat. No. 3,657,600. With devices of this type, the electric field properties for preionization can be made essentially independent of the field properties during electrical pumping. These improved systems represent a significant advance in gas lasers since a discharge can be initiated in a large volume without electrical arcing. These systems result in an increase in the maximum output power, however, the electrical discharge intended for pumping purposes provides much of the initial ionization power and the overall performance is still compromised.

A significantly improved high pressure gas laser is possible with the use of an electron beam to provide both the initial ionization in the gain medium and also to maintain the conductivity of the gas at a suitable level, independent of the electric field. In these systems, an electron beam is directed into the gain medium to provide both the initial ionization and the continuing ionization necessary to balance the loss of electrons through recombination. In this manner, the electric field gradient can be tailored to meet the gain medium pumping criteria without any compromise with respect to ionization criteria. The electron beam assisted lasers provide improved output power and laser pulses of greater duration than had previously been possible. The principal drawbacks of the electron beam systems include the requirements for high voltage equipment which is essential to produce the beam operation and the presence of x-ray radiation which inevitably produced when the electron beam is introduced into the gain medium.

SUMMARY OF THE INVENTION

An object of the present invention is to increase the amount of energy which is transferred to a gain medium with an electric discharge without the onset of arcing and breakdown of the gain medium.

Another object of the present invention is to produce a large volume, uniformly excited gas laser gain medium with electric discharge means.

According to the present invention a gain medium is ionized by exposure to radiation of a preselected wavelength whereby the gain medium assumes an enhanced electrical conductivity thereby allowing a more complete inversion of population in the energy levels of the gain medium which is also subjected to an electric discharge. In one embodiment, a low power laser acts as a source of laser energy which is directed into the gain medium of a higher power laser where it is absorbed, producing the desired initial ionization and the discharge sustaining ionization in the gain medium. In another embodiment, gain medium in a laser resonator is subjected to a pulse of electrical energy which is sufficient to produce laser energy in the resonator; this laser energy causes an optimum ionization of the gain medium for laser pumping and when an appropriately timed second electrical pulse is applied to the gain medium, the resonator provides the high energy laser pulse. In still another embodiment the gain medium is comprised of two laser active gases which are subjected to a sequence of electrical pulses; a first electrical pulse causes laser action in one of the active gases and this laser energy ionizes the gas to a condition more suitable for pumping the second active gas which is then pumped by an appropriately timed second electrical discharge; the net result is a high energy laser pulse.

A primary advantage of the present invention is that the gain medium pumping requirements are optimized independently of the requirements for the ionization required to maintain a conducting path through the gain medium. In addition, the high voltage equipment normally necessarry in the electron beam ionized systems is eliminated. Similarly, the x-rays which are inherently produced in an electron beam system are avoided. The present invention allows the creation of a large population inversion by electric discharge pumping without incurring incipient arcing in the discharge.

One feature of the present invention is that the laser induced preionization is a volumetric process which provides a uniform excitation of the gain medium. Also this form of preionization is suitable for producing a pulse laser output in which the pulses have a duration over the range of one to twenty microseconds. An auxiliary laser provides the required preionization of the gain medium either by photoionization of the gas atoms in the gain medium or by cascade ionization due to the interaction of free electrons in the gain medium. Further, the preionization process can be enhanced by the addition of a low ionization material such as xenon, helium or an alkali metal in both the photoionization and cascade ionization systems. In some embodiments of the invention, the gain medium is seeded with micron-size particles which are suspended in the gas and are capable of vaporization and ionization by the output from the auxiliary laser system.

The foregoing and other features and advantages of the present invention will become more apparent in the light of the following detailed description of preferred embodiments thereof as illustrated in the accompanying drawing.

DESCRIPTION OF PREFERRED EMBODIMENTS

Figure 1:
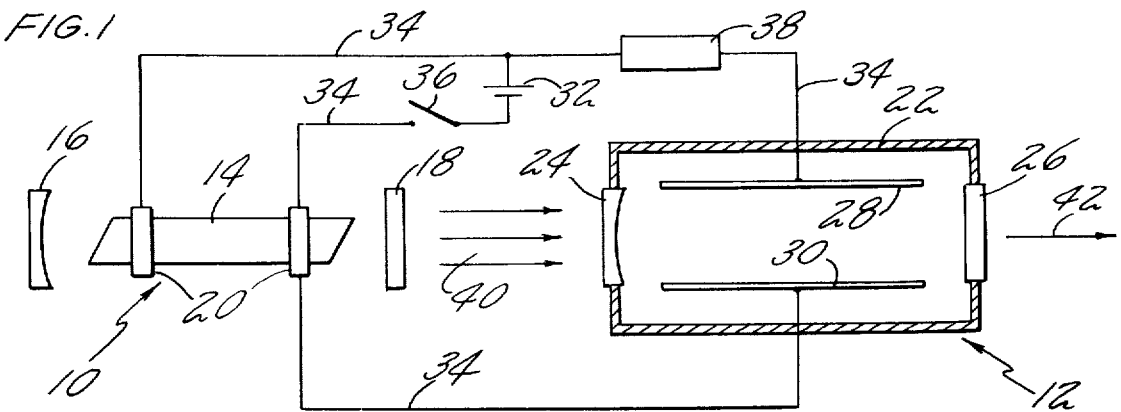
FIG. 1 is a simplified schematic drawing of a linear, high power resonator in which the gain medium is initially preionized with the laser output from an auxiliary laser resonator.

In accordance with the present invention, a gas can be ionized when exposed to radiation of a suitable wavelength by one of two absorption processes, namely, multiphoton ionization or electron cascade ionization. In a multiphoton process, the absorption of either a single photon with enough energy to cause ionization or the absorption of several photons with a cumulative total energy sufficient to cause ionization may be used. If the photon energy is very low relative to the ionization requirement of the gas, some ionization will result due to the statistical distribution of the energy levels in the atoms, however, this mechanism would be inadequate for the present invention. As a practical matter, the photon absorption provides a significant ionization when the wavelength of the photon energy is comparable to the ionization energy. The ionization probability is proportional to the intensity of the photon energy raised to a power which is equal to the number of absorptions required to ionize. Therefore, if the photon energy is less than about one-third of the ionization requirement, the probability of ionization becomes too low for practical applications. In the present invention, the multiphoton absorption process is a desirable method of producing a required gas ionization, since the atoms involved absorb the photon energy directly and the background gas is substantially unheated, although a small amount of heating does occur due to electron recombination.

In the electron cascade process of ionization, the free electrons in a gaseous medium gain energy from a radiation field by collisions with atoms which randomize their oscillatory motion. These high energy electrons collide with other electrons in the orbital shells of the gas molecules and transfer enough energy to the orbital electrons to ionize the molecule. The newly freed electrons interact with the radiation field as did the original free electrons and the cycle is repeated. Electron cascading is most useful for a long wavelength, i.e., a low energy radiation source. This is apparent from the following equation:

$$\frac{dE}{dt} = \frac{e^2 I \nu}{2m\epsilon c(\omega^2 + \nu^2)}$$

where
$dE/dt$ = the rate of gain of energy by a free electron,
$e$ = the electron charge,
$I$ = the laser radiation intensity,
$\nu$ = the electron atom collision frequency,
$m$ = electron mass,
$\omega$ = the radian frequency of the laser radiation,
$\epsilon$ = free space permittivity, and
$c$ = the velocity of light.

Since the electron cascade ionization relies on the absorption of photon energy by free electrons, electron heating results; it is essential to the process that the initially free electrons in the gas and those which are subsequently separated from the parent gas molecules be heated until their kinetic energy is sufficient to ionize other gas atoms upon collision with them. It is critical that the electron cascade not be allowed to progress to the point that an arc discharge is formed. If the plasma absorbs too much energy from the auxiliary source, the stimulated emission produced in the main resonator or a combination of these sources of radiation, a hot dense plasma which is unsuited for laser operation in accordance with the present invention results. A tenuous plasma, that is one that is not fully ionized, can be produced by the breakdown process with the addition of a substance such as helium to the gain medium. An electron cascade can be produced in a gas mixture containing one to ten percent helium and in a tenuous plasma, as contrasted with a hot dense plasma, only a few percent of the ionization radiation is attenuated by the plasma and the cascade process is sustainable. In addition, a continuous wave plasma can be produced in a gas mixture containing xenon without incurring complete attenuation of the ionizing radiation.

The present invention may be practiced with an external source of ionization radiation. When the photon energy of the preferably single-frequency source is matched to the ionization requirement of the gas molecules constituting the gain medium, the probability of ionizing the gas is high. Assuming for the purposes of explanation that the gain medium is a mixture of carbon dioxide and nitrogen at one atmosphere pressure, then the photoionization of a small quantity of gain medium will support a nonarcing electric discharge system and a suitable population inversion can be maintained. An optimum ionization for carbon dioxide of approximately $10^{13}$ electrons per cubic centimeter is readily achieved; this degree of ionization is sufficient to produce the required population inversion with a moderate electric field, not so high that the gain medium transitions into an arcing type discharge.

In a system which utilizes an external ionization source and depends upon cascade ionization to enhance the conductivity of the gain medium, the degree of ionization that is produced in the gain medium must be limited to avoid a hot dense plasma. If breakdown occurs in the gain medium, a fully ionized plasma which is highly absorbing with respect to the ionization radiation can result. Since the rate of energy absorption by an electron increases linearly with gas pressure and also as the square of the wavelength of radiation, cascade ionization is most effective at gas pressures of approximately ten atmospheres and at infrared wavelengths rather than with laser sources having visible wavelengths.

A preferred embodiment of the present invention is shown in FIG. 1 which includes an auxiliary laser 10 and a high power laser 12. The laser 10 is an electric discharge system having a gas enclosure 14 which is located in the optical cavity formed by a first concave mirror 16 and a first flat mirror 18. A pair of ring electrodes 20 is constructed into the enclosure. The high power laser 12 is also an electric discharge device with a gas envelope 22 enclosing the optical cavity formed by a second concave mirror 24 and a second flat mirror 26; an upper electrode 28 and a lower electrode 30 are located within the envelope. A source 32 of electric power is connected with suitable electrical conductors 34 and a switch 36 to the ring electrodes 20 and the electrodes 28, 30. An electric pulse conditioning unit 38 is located between the source 32 and the electrode 28.

The operation of the embodiment shown in FIG. 1 is described in terms of a pulsed, carbon dioxide system utilizing cesium as a seed material in the gain medium of the high power laser; the auxiliary laser is a pulsed nitrogen laser. An electric potential is established between the ring electrodes 20 with the power source 32 by closing a switch 36. Laser action occurs in the auxiliary laser and a low energy laser output beam 40 passes through the partially transmitting mirror 18. The beam 40 passes through the concave mirror 24 which is transparent to the wavelength of the radiation from the auxiliary laser and interacts with the cesium seed contained in the gain medium of high power laser. Since the photon energy of the nitrogen laser is close to the ionization energy of cesium, the auxiliary laser radiation readily ionizes the cesium atoms in the laser gas. The ionized material produces an electron density of approximately $10^{13}$ electrons per cubic centimeter which is optimum for a carbon dioxide laser operated at about one atmosphere of pressure. The electric potential which is maintained between the electrodes 28, 30 causes the gain medium in the envelope 22 to assume a population inversion which produces a high energy laser output 42. A current flows between the electrodes 28, 30; the current density depends upon the electric potential maintained across the electrodes and the existance of suitable conductivity in the gain medium. The interaction between the output energy from the auxiliary laser and the seed material produces the required preionization of the high power laser gain medium. The intent of this operation is to produce as much output energy as possible from the laser 12. The low energy beam 40 is sustained as long as power is applied across the electrodes 20. A sufficient amount of ionization to maintain a nonarching discharge between the electrodes 28, 30 and in turn the laser output 42 occurs as long as the low energy laser 40 interacts with the carbon dioxide gain medium. A main operational characteristic of this system is that a high energy output is available for a long duration since the enhanced conductivity provided by the auxiliary laser maintains the ionization at a sufficient level that the discharge can be sustained without transitioning into an arc type discharge.

Figure 3:
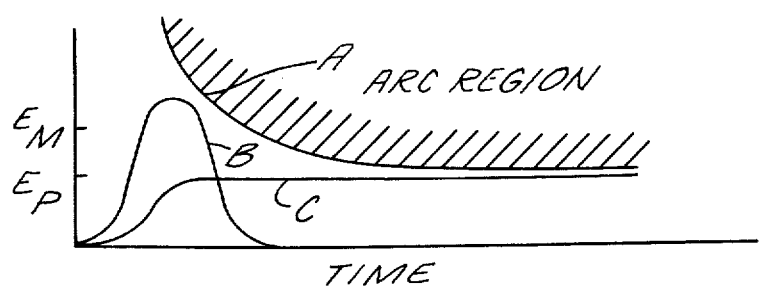
FIG. 3 is a chart of electric field gradient across a gain medium as a function of time showing typical discharge conditions.

The influence of the electric pulse duration on arc formation can be explained with reference to FIG. 3. A premise basic to the concept is, the combination of electric field and pulse duration cannot exceed a critical value without the formation of an arc; the limit is shown as Curve A. In any electric discharge pulse laser, there is a characteristic minimum electric field, $E_M$, which must be exceeded to breakdown the gas and allow a discharge to be initiated, without an auxiliary means of ionization; the electric field variation as a function of time for such a pulse of relatively short duration is shown as Curve B. Further, there is a characteristic electric field $E_P$ which is optimum to pump a laser gas such as carbon dioxide nitrogen. When the condutivity of the gain medium is suitably enhanced with means of auxiliary ionization, the gain medium can be subjected to the electric field $E_P$ indefinitely without the onset of arcing, Curve C. Therefore, if a gain medium is suitably preionized so that a current will flow with only the electric potential required for pumping, an electric field less than $E_M$, otherwise required to initiate the discharge, can be provided to merely pump the gain medium. The result is an electric laser which can be operated theoretically for an infinite duration (continuous wave) without transitioning into an arc mode of discharge. Since the total laser energy is related to the integral of electric field over a duration of time, the radiation induced conductivity enhanced laser systems are capable of high energy output.

Figure 2:
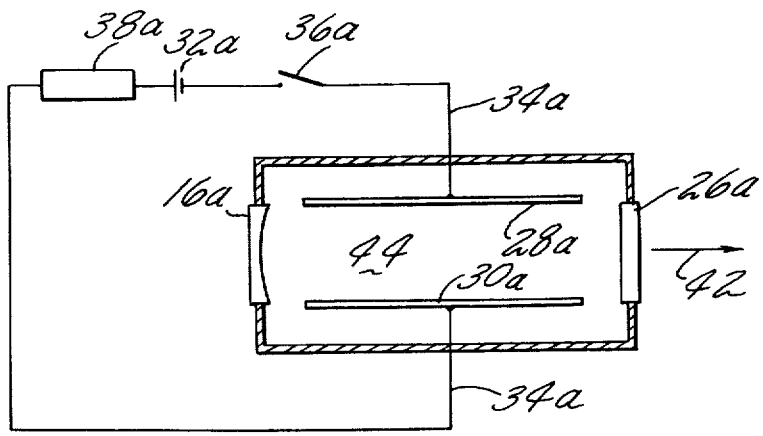
FIG. 2 is a simplified schematic diagram of a double pulsed embodiment of the present invention.
Figure 4:
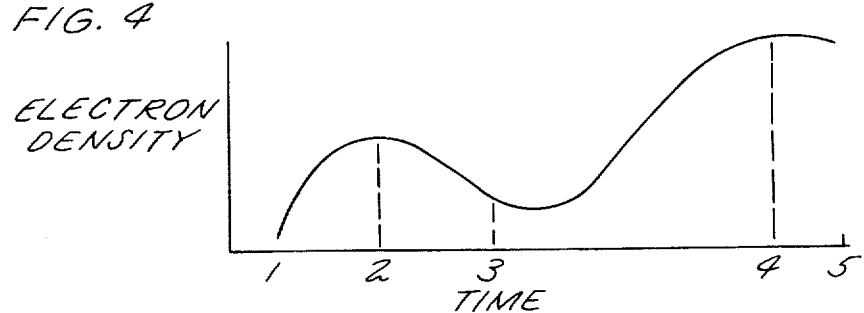
FIG. 4 is a chart of electron density in the laser gain medium as a function of time during the interval of concern in a double pulsed system.
Figure 5:
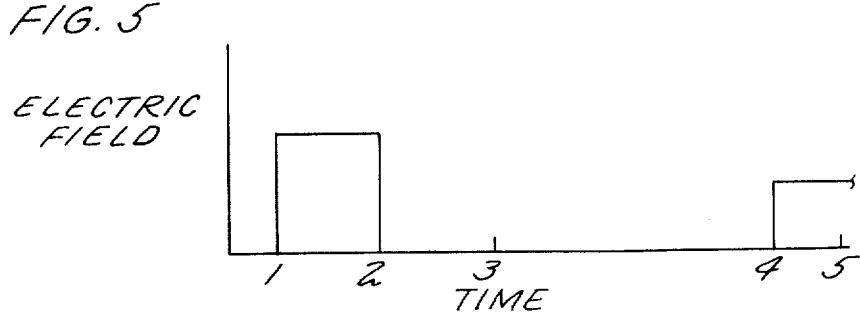
FIG. 5 is a chart of voltage versus time during the time interval of interest showing the double electrical pulse.
Figure 6:
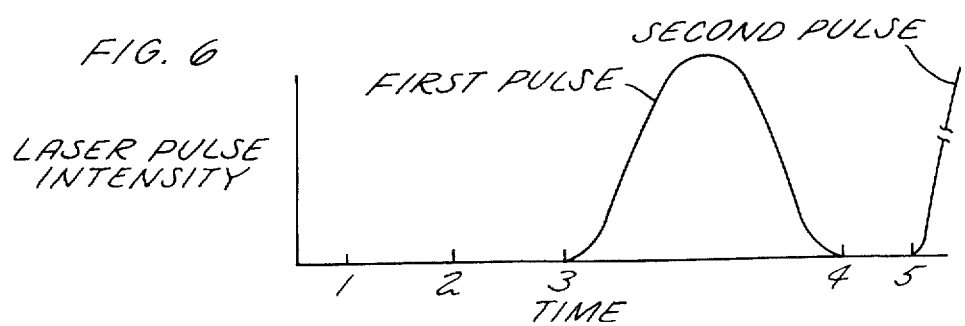
FIG. 6 is a chart of power versus time for each laser pulse in the operation of the double pulsed embodiment of the present invention.

Another embodiment of the present invention is shown in FIG. 2 in which an internal source of preionizing radiation is provided to the gain medium. An optical cavity 44 is formed between a fully reflecting mirror 16a and a partially transmissive mirror 26a. The gain medium is located in the cavity 44 between electrodes 28a, 30a. The electrodes are connected to a power source 32a with suitable electrical connectors 34a including a switch 36a and a pulse conditioning unit 38a. This embodiment is a double pulsed or two electric pulse laser system. Operation is initiated by closing switch 36a to apply a potential to the electrodes 28a, 30a. a first electric pulse ionizes the gain medium in the cavity 44 and produces an electron density which varies in time as is shown in FIG. 4. The time relationship between the first pulse and the electron density resulting therefrom is shown with FIG. 5. The electric field maintained across the gain medium from time 1 to time 2 produces a population inversion which results in a first pulse of laser energy beginning at time 3 as is shown in FIG. 6. The first pulse of laser energy is absorbed by the gain medium and ionizes the medium causing the electron density to increase to a maximum as is shown in FIG. 4. At time 4 a second electric pulse is applied to the gain medium between the electrodes 28a, 30a. The second pulse is tailored in voltage by the conditioning unit 38a to produce optimum pumping of the gain medium and a second laser pulse of very high energy is initiated at time 5 as is shown also in FIG. 6. The second laser pulse terminates when the population inversion created in the second pumping pulse is depleted.

An alternate embodiment of the internal ionization source embodiment involves the use of a gain medium in which two different laser gases such as carbon dioxide and hydrogen fluoride are contained. The system is operated as was just described to produce a pulse of laser energy from one of the laser gases. This pulse is absorbed by the second laser gas which is thereby ionized or ignited to chemically react. The second gas is then subjected to an electric pulse or combusts and an output pulse of very high energy is produced.

In either the multiphoton ionization or electron cascade ionization processes which are produced with either an external or an internal ionization source, the gain medium can be seeded with a suitable material such as the alkali metals, xenon or helium; to produce the required ionization. The seed is selected so that the photon energy of the radiation source is matched to the ionization energy requirement of the seed and the seed must be a material having an ionization potential which does not have a resonance with the laser gas. Solid particles of micron size can also be used as a seed material. The ionization of the particulate suspended in the gas can provide sufficient ionization for the laser and may require a less intense auxiliary laser beam than those required for a gas seed. The particles are normally easier to ionize than a gas and the particulate ionization does not depend critically upon the matching of the laser wavelength with the resonance of the particles.

The external source of ionizing radiation is generally an auxiliary laser system although any source of suitable frequency and intensity electromagnetic radiation such as mercury arc or flash lamps is suitable for use with the present invention if the radiation wavelength produced is approximately matched to the ionization energy of the gain medium gas.

Although this invention has been shown and described with respect to preferred embodiments thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A gas laser comprising:
   a gas envelope for containing a gain medium including an active laser gas;
   an optical resonator positioned within the envelope for light amplification by stimulated emission of radiation;
   electric discharge means within the envelope for pumping the gain medium by providing a nonarcing electric discharge across the medium;
   a source of electric power for providing an electric potential to the discharge means; and
   an electric power conditioning unit for providing electric potential to the electric discharge means as two sequenced pulses, the first pulse having an electric field gradient that exceeds the breakdown gradient of the gain medium and produces a population inversion therein whereby the gain medium laser producing a laser pulse of low energy content, the laser radiation from the low energy pulse being absorbed by the gain medium which is further ionized, and the second pulse providing additional pumping of the gain medium in a nonarc discharge to produce a laser pulse of high energy content by stimulated emission.

2. The laser according to claim 1 in which the gain medium contains first and second active laser gases wherein the first of the sequenced electric pulses excites the first laser gas which lases thereby producing laser radiation at a first wavelength which in turn is absorbed by the second laser gas which is excited by the second sequenced electric pulse to produce laser radiation at a second wavelength which is emitted from the resonator.

3. A gas laser for producing energy in the form of coherent electromagnetic radiation comprising:
   an optical resonator for producing laser radiation oscillations with a gain medium;
   means for producing radiation which is injected into the resonator and absorbed by the gain medium thereby enhancing the electrical conductivity of the gain medium; and
   means for passing a nonarcing electric current through the conductivity enhanced gain medium to produce a population inversion in the energy levels of the gain medium.

4. The laser according to claim 3 in which the gain medium contains one to ten percent helium to cause a tenuous plasma wherein less than five percent of the pulsed radiation injected into the resonator is attenuated by the plasma to sustain an ionization cascade in the gain medium.

5. The laser according to claim 4 in which the active laser gas in the gain medium is essentially carbon dioxide.

6. The laser according to claim 3 in which the gain medium contains a seed material that is readily ionizable when subjected to electromagnetic radiation which is injected into the resonator.

7. The laser according to claim 6 in which the seed material is a solid.

8. The laser according to claim 6 in which the seed material is selected from the group consisting of xenon, helium, and alkali metal.

9. The laser according to claim 3 in which the gain medium contains first and second active laser gases each of which produces laser energy at a different wavelength wherein the radiation injected into the resonator is absorbed by the first laser gas which becomes excited and lases thereby producing laser radiation at a first wavelength which is absorbed by the second laser gas which is excited by the electric discharge to produce laser radiation at a second wavelength which is emitted from the optical resonator.

10. The laser according to claim 9 in which the first and second active laser gases are carbon dioxide and hydrogen fluoride respectively.

11. The method of producing laser energy by stimulated emission of radiation from a gain medium in a resonant optical cavity including the steps of:

introducing electromagnetic radiation into the optical cavity to cause ionization of the gain medium whereby the electrical conductivity of the gain medium is enhanced, the ionizing radiation being resonant with the ionization requirement of the gain medium; and electrically pumping the gain medium to cause stimulated emission in the resonator, the electric pumping means consisting of an electric discharge which is maintained at a potential that is sufficient to efficiently pump the gain medium but is insufficient to maintain an electric discharge across the gain medium in the absence of the ionization radiation.

12. A method of producing high energy with a gas laser including the steps of:

providing a gas envelope for containing a gain medium including an active laser gas;

establishing an optically resonant region within the envelope between a first and a second mirror;

introducing electromagnetic radiation into the resonator through the first mirror, the wavelength of the radiation being suitably matched to the ionization energy requirements of the gain medium to ionize the gain medium, thereby enhancing the electrical conductivity of the gain medium;

pumping the gain medium with a nonarching electric discharge to produce a population inversion in the energy levels of the gain medium; and passing radiation which is emitted by stimulated emission from the gain medium, out of the resonator through the second mirror, the wavelength of the radiation from the gain medium being different than the ionization radiation.

* * * * *